W. J. ROSTERN.
VEHICLE PROPULSION.
APPLICATION FILED OCT. 3, 1914.

1,286,420.

Patented Dec. 3, 1918.
2 SHEETS—SHEET 1.

WITNESSES:
Arthur Choquet
Wm. E. Dunn

INVENTOR.
William J. Rostern,
BY Clifford E. Dunn
ATTORNEY

W. J. ROSTERN.
VEHICLE PROPULSION.
APPLICATION FILED OCT. 3, 1914.
1,286,420.
Patented Dec. 3, 1918.
2 SHEETS—SHEET 2.
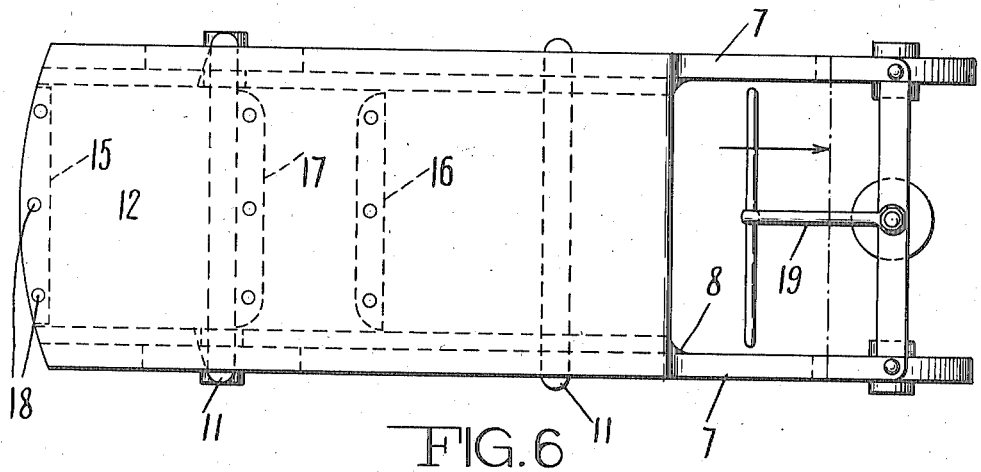
FIG. 6
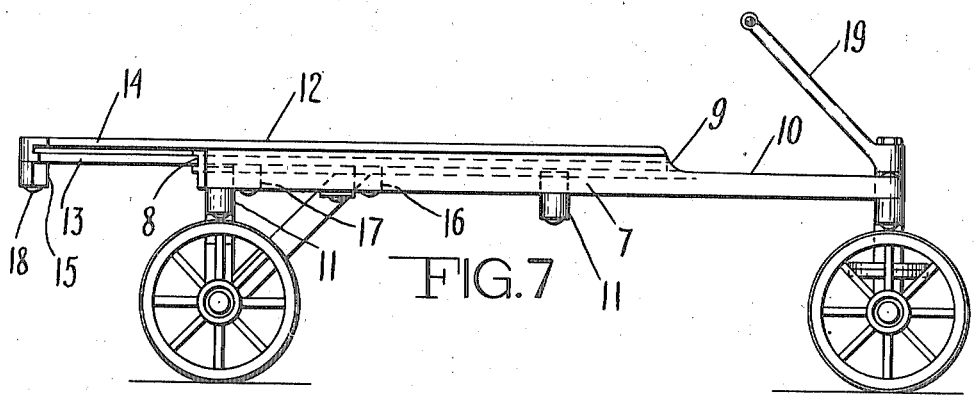
FIG. 7
FIG. 8
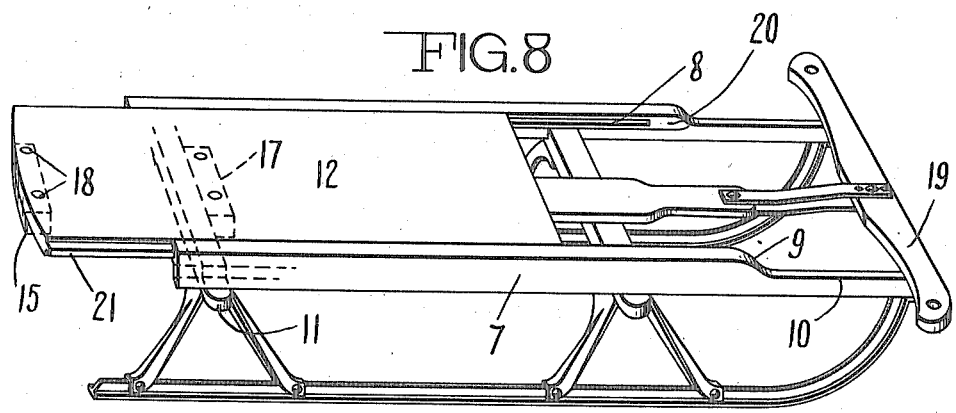
WITNESSES:
Arthur Choquet
Wm. E. Dunn
INVENTOR.
William J. Rostern,
BY
ATTORNEY

UNITED STATES PATENT OFFICE.

WILLIAM J. ROSTERN, OF NEW YORK, N. Y.

VEHICLE PROPULSION.

1,286,420.

Specification of Letters Patent.

Patented Dec. 3, 1918.

Application filed October 3, 1914. Serial No. 864,836.

*To all whom it may concern:*

Be it known that I, WILLIAM J. ROSTERN, a citizen of the United States, residing at New York, in the county and State of New York, have invented certain new and useful Improvements in Vehicle Propulsion, of which the following is a full, clear, and exact description.

The present invention relates generally to improvements in vehicles, and more particularly to means of propulsion of sleds, wagons and the like, such as are ordinarily employed by children as a means of amusement and sport.

One of the objects of the present invention is to provide a means for assisting in the propulsion of a vehicle, such as a sled for instance, by applying a sudden shock or a blow thereto in a manner, whereby the impact will add to or increase the momentum of the vehicle, so that it will cover or travel over a greater distance than would otherwise be possible.

Another object of my invention is to produce a means for obtaining the result just described, which will be simple to operate, and the art of properly manipulating the same may be readily acquired by a child of the most tender years, thereby greatly increasing the pleasure derived from the use of the sled and at the same time, causing the child, or other user of the vehicle, embodying my invention, to indulge in exercise, which will be beneficial to parts of the body, which are not brought into movement by the use of a vehicle, in which my invention is not employed.

My invention also contemplates the provision of means of vehicle propulsion, as and for the purposes heretofore described, which will be simple in construction, durable and economical to produce, so that it may be readily embodied in the building of a vehicle of any type to which it is adaptable without increasing the cost of that vehicle to any material extent, over what it would cost to manufacture the same without the addition of my improved propelling means. Furthermore, my invention may also be applied to any existing forms of vehicles, to which it is adaptable without materially changing the construction thereof.

My invention also comprehends a device of the character described, which will embody elements of structure, which will make it positive in operation under various conditions of use and will result in the attainment of the highest efficiency in the accomplishment of the object, for which it is intended.

In order to clearly illustrate and describe my invention, I have elected to show it as applied to a sled of the so-called "flexible type," such as is commonly used by children and adults for coasting purposes, though I would have it particularly understood that I do not limit myself to this single application of my invention, since it is obvious that it may also be used in connection with a wheel vehicle and that the principle may be applied to vehicles of different kinds, having a more utilitarian purpose, than those designed for the use of children, as a source of amusement or sport.

I shall now proceed to describe my invention with reference to the accompanying drawings, and then point out with more particularity, the essential elements of novelty therein in the appended claims.

In the drawings,

Fig. 6 is a plan view of a wheel vehicle with my invention applied thereto.

Fig. 7 is a side elevation of the vehicle shown in Fig. 6, and

Fig. 8 is a view in perspective of a sled, showing a modification of my invention.

Figure 1:
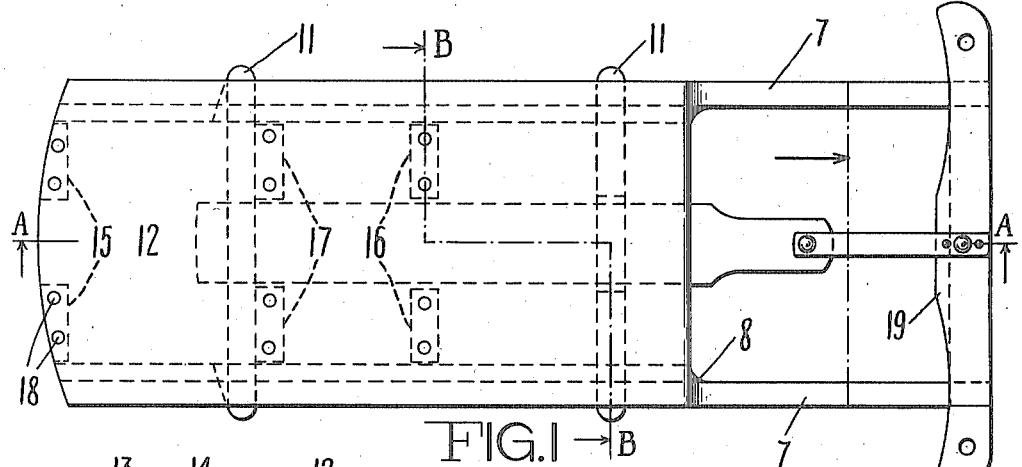
Figure 1 is a plain view of a sled embodying my invention.
Figure 2:
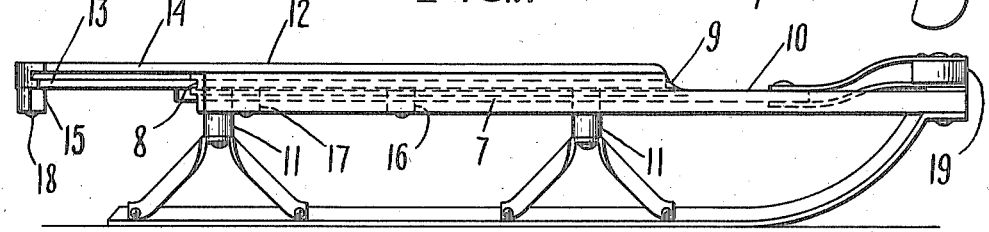
Fig. 2 is a side elevation thereof.

Referring now to the drawings in detail, in which like characters of reference are employed to designate similar parts throughout the several views, and more particularly to the application of my invention as shown in Figs. 1 to 5, inclusive, 7 indicates the longitudinal side bars or supports of a sled of the so-called "flexible type," which is guided or steered in its course of movement by warping the runners in a manner well known to those skilled in the art to which this invention appertains.

It will be observed that in the embodiment of my invention in this type of vehicle, the side bars or supports are formed with longitudinal grooves 8 on their inner faces, the portions of the side bars or supports in which these grooves are provided, being of a greater thickness (as shown at 9) than the forward parts 10 of the side bars, which in sleds of this type must possess a degree of flexibility sufficient to permit of the efficient steering of the vehicle. The side bars 7 are connected and maintained in relatively parallel positions by the usual transverse or cross tie-pieces 11.

The numeral 12 indicates the top or seat of the sled, which is preferably of a width sufficient to bring the outer edges thereof in the same vertical plane as the outer faces of the side bars or frame 7. The top or seat 12, it will be noted, is so shaped along its edges, as to form a tongue 13, extending longitudinally thereof and which is adapted to fit within the groove 8, provided in the side bars 7, the relative dimensions of the tongue and groove being so arranged as to permit of a free or sliding movement of the tongue within the latter, for the purposes, which will be hereinafter more fully explained.

In the formation of this tongue and the coöperation of the seat or top 12 of the vehicle with the side bars or supports 7, it will be seen that an extended bearing surface is provided for the seat or vehicle top 12, as shown at 14, this bearing surface being wholly supported by the upper face of the adjacent side bar or support 7. The combination of this bearing surface and the tongue sliding within the groove produces a supporting means for the sliding top or seat 12, which possesses great strength and durability, so that the vehicle, as exemplified in the particular illustrations now being described, may be put to considerable rough usage without impairing its degree of serviceability.

From the foregoing description, it will be manifest that the object of the construction thus far described, is to provide a sliding seat or top, the movement of which may be controlled by the user of the vehicle. It is obvious that in order to obtain an efficient and serviceable device of this character, means must be provided for limiting the sliding movement of the seat of the vehicle top and to this end, I provide stops 15 and 16, respectively, consisting of blocks or the like, rigidly secured to the underside of the vehicle seat 12, which are respectively adapted to abut against the rear faces of the cross bars or tie pieces 11, when the seat 12 has reached its limit of movement in a forward direction. To limit the movement of the seat 12 in the reverse or rearward direction, I provide a stop 17 similar in construction to those just described, which is arranged to abut against the forward face of the rear transverse bar or tie piece 11. While these stops are herein shown as in the form of blocks, which are secured to the underside of the seat 12 by means of screws or rivets 18, it is apparent that any other suitable means for effecting the desired end may be employed, and I would have it understood that I do not limit myself to this particular detail of structure in carrying my invention into effect.

Figure 3:
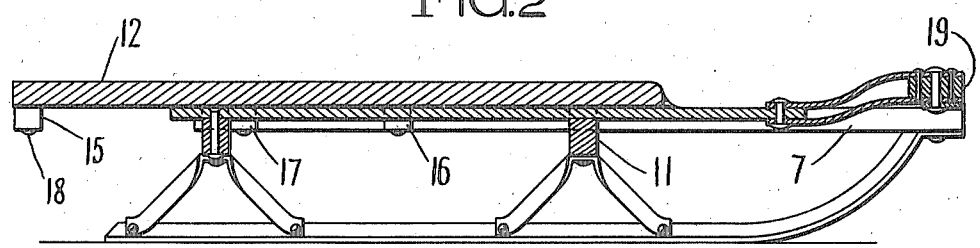
Fig. 3 is a longitudinal section taken on line A—A, of the vehicle shown in Fig. 1.
Figure 4:
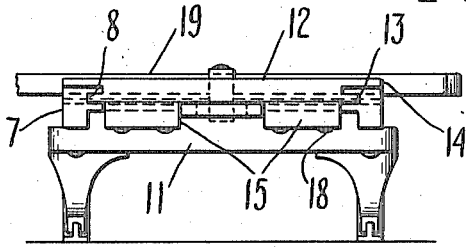
Fig. 4 is a rear elevation of the sled shown in Fig. 1.
Figure 5:
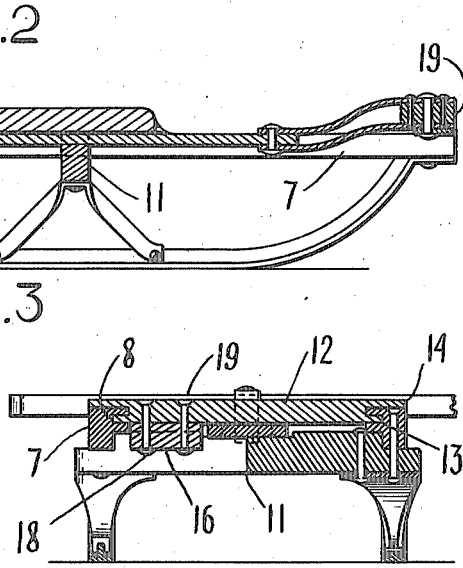
Fig. 5 is a transverse section on the line B—B of Fig. 1.

In the employment of my invention, in conjunction with the particular type of vehicle shown in Figs. 1 to 5, inclusive, we shall assume that the sled is being used for coasting purposes and is rapidly traveling down grade under the weight of the rider and the impetus given to the vehicle by the force of gravitation. As is well known, when the vehicle nears the terminus of the grade or incline, it is the most natural thing for the user to resort to a backward-and-forward swaying movement of the body in an endeavor to prolong the forward movement of the sled. This method, while it is customarily resorted to, is far from being successful in the attainment of the desired end, in the ordinary type of sled of the "Flexible Flyer" or other type. However, by incorporating my invention in any type of vehicle, it is obvious that by the user of the vehicle grasping the guiding or steering bar 19 and drawing himself forward, his body being in frictional contact with the seat 12, the latter will be pulled or moved forward, causing the abutments of stops 15 and 16 to strike against the faces of the transverse bars or tie pieces 11, the impact of these abutments hitting against the tie pieces, accelerating the movement of the vehicle and causing it to materially increase its range of travel or transit. The return movement of the sliding seat 12 to its normal position is simply accomplished by the user of the vehicle bracing himself against the steering bar 19 and pushing himself in a backward direction therefrom, the seat moving with him until its motion is arrested by the stop 17 engaging the rear transverse frame member 11, as shown in Fig. 3.

It will be manifest that the reciprocatory movement of the sliding seat 12, in the manner described, may be readily mastered, so that with a little dexterity, the reciprocation may be so rapid and timed that the stops 15 and 16 will strike against the transverse bars 11 with considerable force, forcing the vehicle forward, while in the rearward movement of the seat, the stops 17 will barely contact with the rear transverse bar 11, so that the benefit of the increased momentum gained by the forward movement of the seat will not in any wise be diminished.

In Figs. 6 and 7 of the drawings, I have shown my invention applied to a wheel vehicle of one of the usual types, the construction of the side frames of this vehicle being similar to the side frames of the sled, illustrated in Figs. 1 to 5, inclusive, and the operation of the device being effected in the same manner.

In Fig. 8, I have shown a modified form of my invention, wherein in lieu of the stops 16, I provide a means for limiting the movement of the seat 12 in a forward direction by terminating the grooves 8 a short distance from the forward ends of the ways 20, which, in this embodiment of my invention, may be independent of the side bars 7 of the vehicle and firmly secured or attached thereto by means of suitable screws or the like.

Furthermore, in this modified form of my invention, it will be noted, that the edges of the seat 12 are provided with an outwardly projecting tongue 21 extending longitudinally thereof, which is freely movable within the grooves 8, the upper surface of the seat 12 being flush with the upper or top surface of the parallel ways 20, the seat being slidable therebetween. By the construction of this modification of my invention, it will be apparent that the portion adjacent to the seat being stationary affords a means for gripping the sides of the vehicle, so that if desired, the steering thereof may be accomplished by the feet positioned on the steering bar 19, and the reciprocation of the seat effected by the conjoint use of the upper and lower limbs of the user, the sides or ways 20 being grasped by the hands.

While I have described my invention with particular reference to the specific details of structure, shown in the several illustrations, it is obvious that many changes may be made in the construction of means for guiding the movement of the seat and also for limiting the reciprocation thereof, without departing from the spirit and scope of my invention, which is directed to the improved propelling means consisting of a seat adapted to be reciprocated, whereby its movement in one direction will produce an impact or shock, which will serve to convey an added impetus to the vehicle, of which it is a part and thereby increase the momentum thereof.

Having thus described my invention what I claim as new herein and desire to secure by Letters Patent is:

1. A means for accelerating the momentum of a vehicle, consisting of a reciprocatory member mounted on the vehicle and arranged to abut against a part of the vehicle to produce an impact of a degree sufficient to add to the impetus or movement of the vehicle.

2. In a vehicle, the combination of a reciprocatory member mounted thereon, means for guiding the movement of said member, and means carried by said member and arranged to abut against a portion of said vehicle, whereby a predetermined movement of said reciprocatory member will produce an impact to accelerate the movement of said vehicle.

3. In combination with a vehicle, a reciprocatory member mounted thereon, means carried by said vehicle and adapted to engage with means carried by said member to guide the movement of the latter, stops carried by said reciprocatory member and arranged to limit the movement of said member in two directions, whereby the movement of said member in a predetermined direction will cause certain of said stops to abut against a portion of said vehicle to produce an impact and accelerate the movement of the vehicle.

4. In a vehicle, the combination with a sliding seat, means formed thereon adapted to engage with portions of said vehicle to guide the movement of said seat, stops carried by said seat and arranged to abut against a portion of said vehicle to limit the movement of the seat in one direction, stops carried by said seat and arranged to abut against a portion of said vehicle to limit the movement of said seat in the other direction, whereby the reciprocation of said seat in a predetermined direction to abut against the coöperating portions of the vehicle will produce an impact to accelerate the movement of the vehicle.

5. In a vehicle, the combination of a reciprocatory member, means associated with said member and said vehicle and adapted for coöperation to guide the reciprocatory movement of said member and means for limiting such reciprocatory movement, whereby the movement of the vehicle will be accelerated.

6. In combination with a vehicle, having a pair of parallel side bars, each side bar being formed with a groove therein, a seat mounted on said side bars and formed with a tongue arranged to fit within each of said grooves, means for reciprocating said seat, and stops carried by said seat and arranged to engage with portions of said vehicle to limit the movement of said seat in two directions, certain of the stops carried by said seat being adapted to strike against the coöperating portions of the vehicle with an impact sufficient to overcome the inherent inertia of the vehicle body.

7. The combination with a vehicle, of means mounted to reciprocate thereon and capable of manual operation to produce an impact between said vehicle and said member, whereby the movement of the vehicle will be accelerated.

8. In combination with a vehicle, a movable part, the movement of which is adapted to be controlled to produce an impact against a fixed part of the vehicle, whereby the movement of the vehicle will be accelerated.

In witness whereof I have hereunto set my hand in the presence of two subscribing witnesses.

WILLIAM J. ROSTERN.

Witnesses:
 WM. C. DUNN,
 P. FRANK SONNEK.